(12) United States Patent
Lai

(10) Patent No.: US 6,505,440 B1
(45) Date of Patent: Jan. 14, 2003

(54) DOUBLE-LAYER FLOWERPOT

(76) Inventor: Yuan-Song Lai, No. 32, Fuyi Rd., Taiping City, Taichung County (TW)

( * ) Notice: Subject to any disclaimer, the term of this patent is extended or adjusted under 35 U.S.C. 154(b) by 0 days.

(21) Appl. No.: 10/023,657

(22) Filed: Dec. 21, 2001

(51) Int. Cl.[7] ............................................. A01G 25/00
(52) U.S. Cl. ......................................................... 47/79
(58) Field of Search ................................... 47/79, 65.5

(56) References Cited

U.S. PATENT DOCUMENTS

| | | | | |
|---|---|---|---|---|
| 2,605,588 A | * | 8/1952 | Lindstaedt | 47/67 |
| 4,148,155 A | * | 4/1979 | Allen | 119/77 |
| 4,236,352 A | * | 12/1980 | Heaney et al. | 119/246 |
| 4,265,050 A | * | 5/1981 | Buescher | 47/71 |
| 4,885,870 A | * | 12/1989 | Fong | 47/79 |
| 5,341,596 A | * | 8/1994 | Kao | 47/71 |
| 5,517,790 A | * | 5/1996 | Jennings | 47/79 |
| 5,704,162 A | * | 1/1998 | Holtkamp, Jr. | 47/79 |
| 5,743,045 A | * | 4/1998 | Hicks | 47/71 |
| 6,006,472 A | * | 12/1999 | Holtkamp, Jr. | 47/79 |
| 6,276,090 B1 | * | 8/2001 | Lai | 47/79 |
| 6,363,658 B1 | * | 4/2002 | Lai | 119/246 |

* cited by examiner

Primary Examiner—Charles T. Jordan
Assistant Examiner—Jordan M Lofdahl
(74) Attorney, Agent, or Firm—Rosenberg, Klein & Lee

(57) ABSTRACT

A double-layer flowerpot is constructed to include an outer pot body, the outer pot body having an upright bottom tube, an inner pot body mounted in the outer pot body and defining with the outer pot body a water chamber outside the inner pot body, the inner pot body having an upright bottom tube sleeved onto the upright bottom tube of the outer pot body, and a hollow lock screw bolt threaded into the upright bottom tube and stopped at the topmost edge of the upright bottom tube of the inner pot body to fix the outer pot body to the inner pot body and to provide a passage for ventilation and output of an overflow of water.

3 Claims, 5 Drawing Sheets

DOUBLE-LAYER FLOWERPOT

BACKGROUND OF THE INVENTION

1. Field of the Invention

The present invention relates to flowerpots and, more particularly, to a double-layer flowerpot, which automatically supplies water from the outer pot body to the soil in the inner pot body, and automatically carries off excessive amount of rainwater.

2. Description of the Related Art

FIG. 1 shows a double-layer flowerpot according to the prior art. This structure of double-layer flowerpot comprises an outer pot body 1, an inner pot body 2 mounted in the outer pot body 1, a water chamber H defined within the outer pot body 1 outside the inner pot body 2, air vents 4 and 5 through the outer pot body 1 and the inner pot body 2, and an absorptive member 3 embedded in the soil carried in the inner pot body 2 and inserted through the bottom center hole of the inner pot body 2 and dipped in water W in the water chamber H. This design of double-layer flowerpot has numerous drawbacks as outlined hereinafter.

1. The absorptive member wears quickly with use. When damaged, the absorptive member cannot absorb water from the water chamber to wet the soil in the inner pot body.

2. The absorptive member cannot automatically control the supply of water to the soil carried in the inner pot body, and the soil tends to be excessively moistened.

3. Because the bottom side of the double-layer flowerpot is closed and has no way for ventilation, the roots of the pot plants cannot obtain sufficient air.

4. Because the inner pot body and the outer pot body are fixedly sealed together, the inner pot body cannot be removed from the outer pot body for cleaning.

SUMMARY OF THE INVENTION

The present invention has been accomplished to provide a double-layer flowerpot, which eliminates the aforesaid drawbacks. It is one object of the present invention to provide a double-layer flowerpot, which is detachable. It is another object of the present invention to provide a double-layer flowerpot, which automatically drains off excessive rainwater. It is still another object of the present invention to provide a double-layer flowerpot, which enables air to circulate through the bottom side so that the roots of the pot plant can obtain sufficient air. According to one aspect of the present invention, the double-layer flowerpot comprises an outer pot body, the outer pot body having an upright bottom tube, an inner pot body mounted in the outer pot body and defining with the outer pot body a water chamber outside the inner pot body, the inner pot body having an upright bottom tube sleeved onto the upright bottom tube of the outer pot body, and a hollow lock screw bolt threaded into the upright bottom tube and stopped at the topmost edge of the upright bottom tube of the inner pot body to fix the outer pot body to the inner pot body and to provide a passage for ventilation and output of an overflow of water. According to another aspect of the present invention, the outer pot body has a coupling flange protruded from the topmost edge thereof, and the inner pot body has a coupling flange protruded from the top rim thereof and detachably coupled to the coupling flange of the outer pot body. According to still another aspect of the present invention, a ventilation filter is mounted in the inner pot body to carry soil in the inner pot body and pot plants in the soil, and a water control device is installed in the inner pot body below the ventilation filter and adapted to automatically regulate the supply of water from the outer pot body to the inside of the inner pot body.

DETAILED DESCRIPTION OF THE PREFERRED EMBODIMENT

Figure 1:
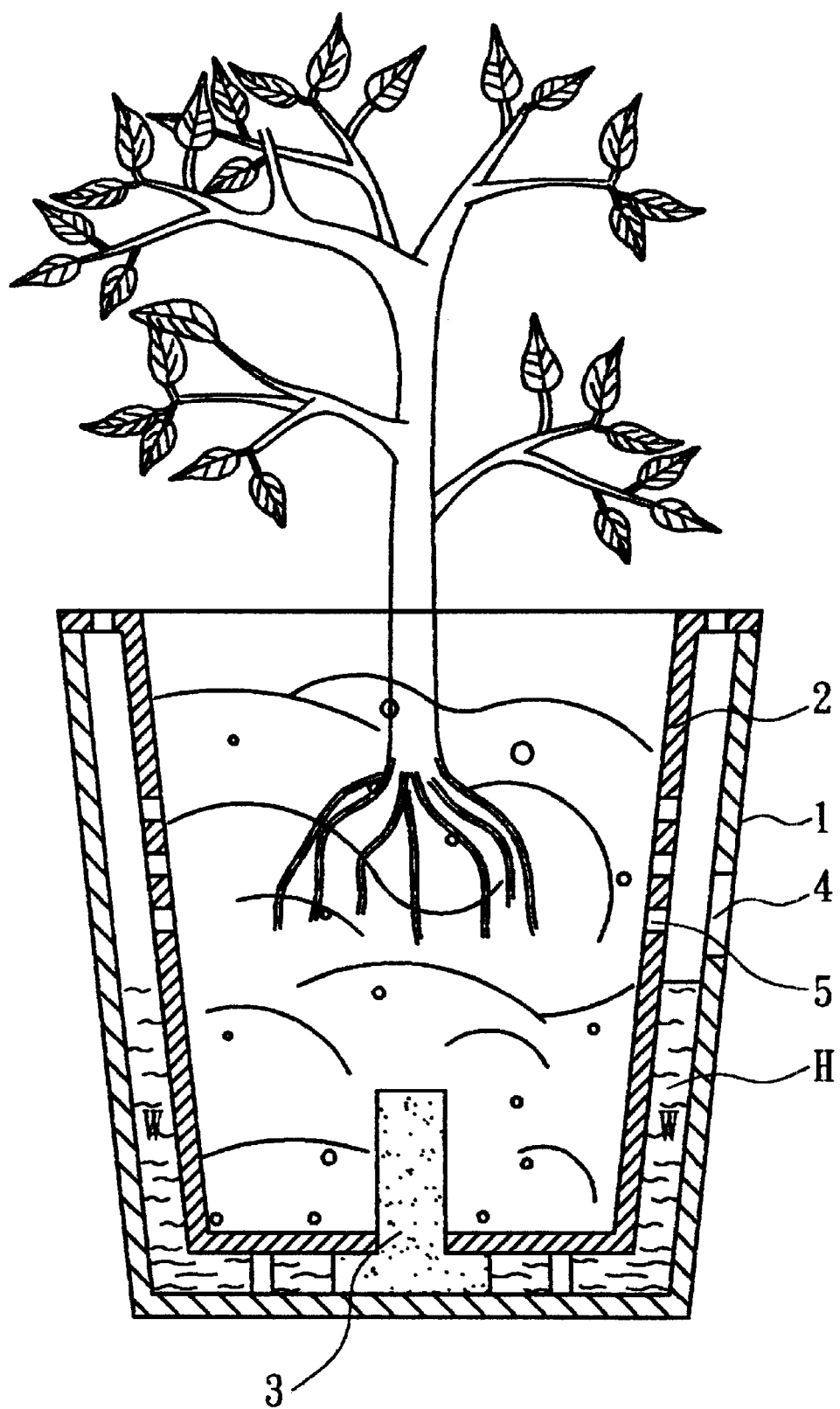
FIG. 1 is a sectional view showing a double-layer flowerpot according to the prior art.
Figures 2, 2A, 2B:
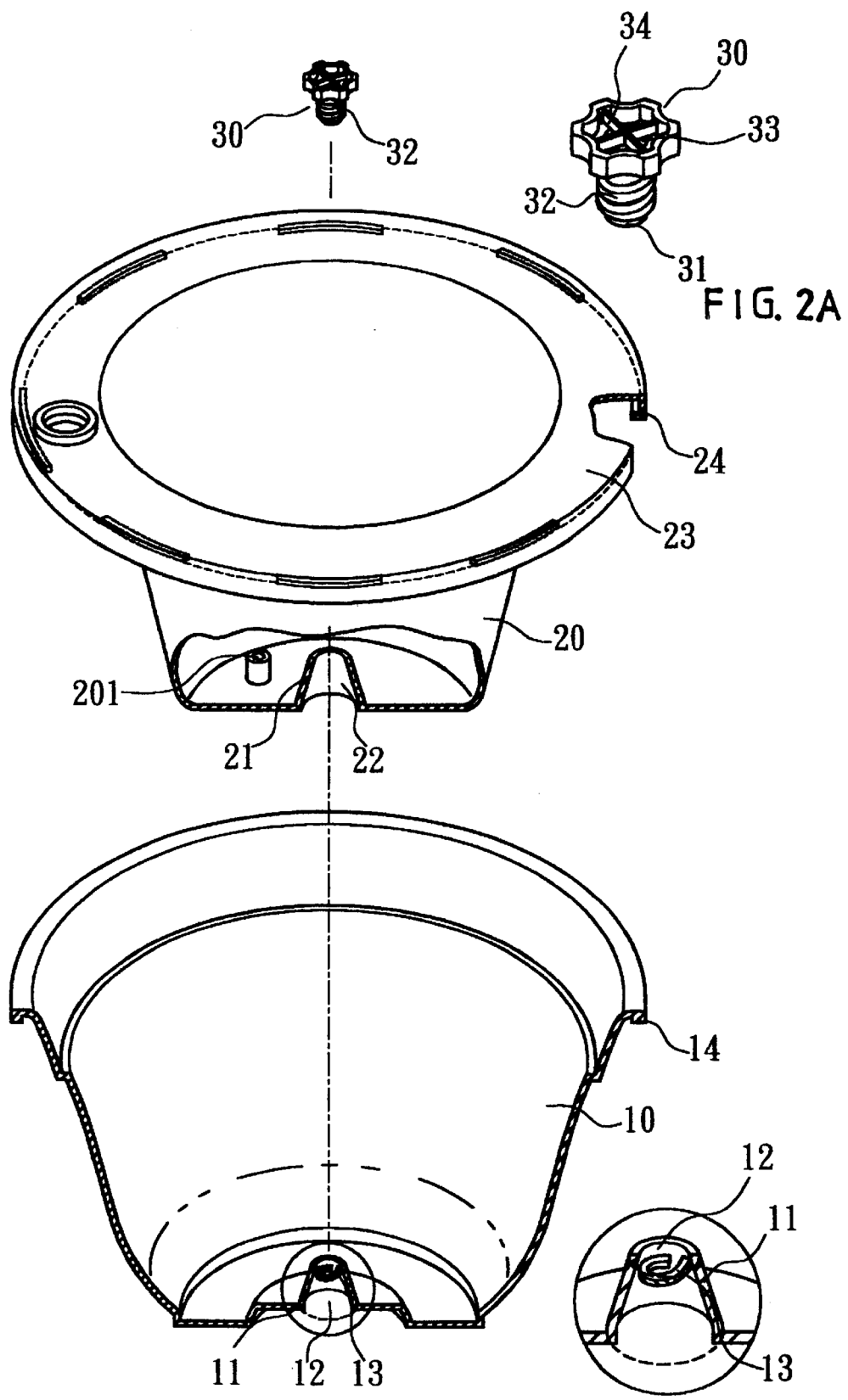
FIG. 2 is an exploded view of a double-layer flowerpot constructed according to the present invention.
FIG. 2A is an enlarged view of the lock screw bolt shown in FIG. 2.
FIG. 2B is an enlarged view of a part of the outer pot body shown in FIG. 2.
Figure 3:
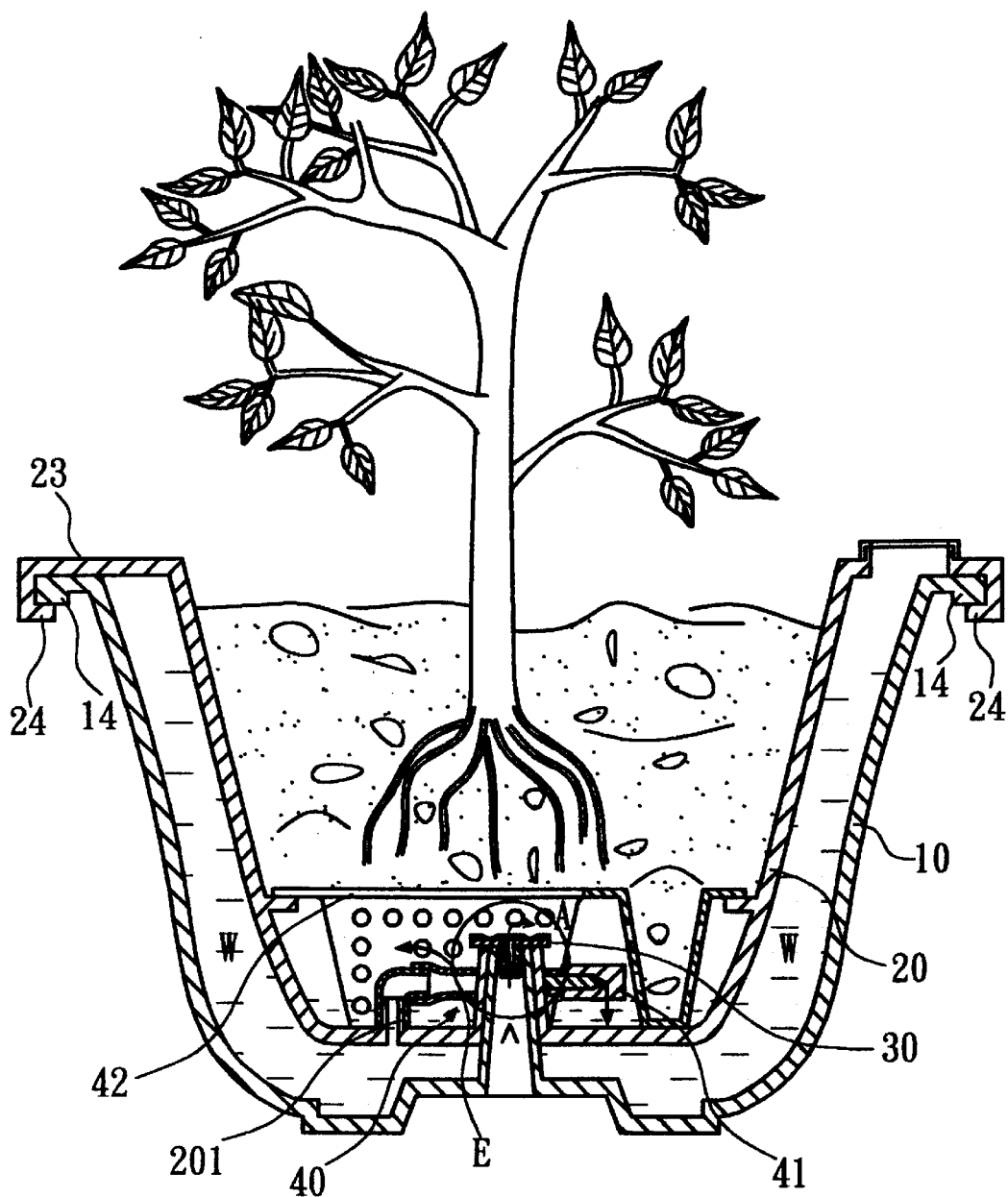
FIG. 3 is a sectional view showing an application example of the present invention.
Figure 3A:
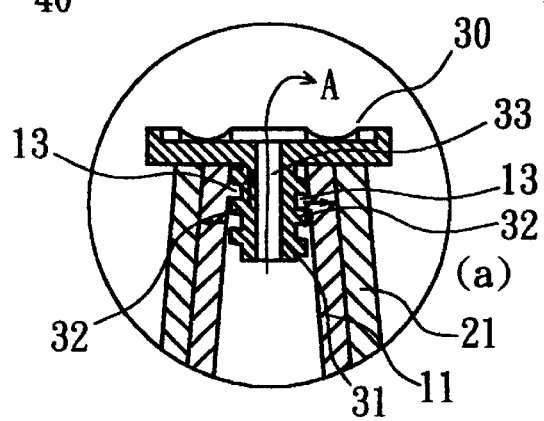
FIG. 3A is an enlarged view of a part of FIG. 3.

Referring to FIGS. 2, 2A, 2B, 3, and 3A, a double-layer flowerpot in accordance with the present invention is shown comprised of an outer pot body 10, an inner pot body 20 mounted in the outer pot body 10, and a lock screw bolt 30 fastened to the inner pot body 20 and the outer pot body 10 to secure the inner pot body 20 to the outer pot body 10. The inner pot body 20 has a water inlet 201 adapted for guiding water from the outer pot body 10 to the soil carried in the inner pot body 20, and an upright bottom tube 21. The upright bottom tube 21 defines an air hole 22 extended through the bottom sidewall of the inner pot body 20. The outer pot body 10 comprises an upright bottom tube 11. The upright bottom tube 11 defines an air hole 12 extended through the bottom sidewall of the outer pot body 10. After mounting of the inner pot body 20 in the outer pot body 10, the upright bottom tube 21 of the inner pot body 20 is sleeved onto the upright bottom tube 11 of the outer pot body 10. Further, the upright bottom tube 11 of the outer pot body 10 has an inner thread 13 around the air hole 12. The lock screw bolt 30 comprises a hollow shank 31, an outer thread 32 extended around the periphery of the hollow shank 31, a hollow head 33 connected to the periphery of the top end of the shank 31, and reinforcing ribs 34 suspended in the hollow head 33. During installation, the outer thread 32 of the lock screw bolt 30 is threaded into the inner thread 13 of the upright bottom tube 11 of the outer pot body 10, keeping the hollow head 33 supported on the topmost edge of the upright bottom tube 11 of the outer pot body 10 and the topmost edge of the upright bottom tube 21 of the inner pot body 20. Further, the outer pot body 10 has a top coupling flange 14 extended around the periphery, and the inner pot body 20 has a coupling flange 24 protruded from the top rim 23 thereof and coupled to the peripheral top coupling flange 14 of the outer pot body 10.

Referring to FIGS. 3 and 3A again, a ventilation filter 42 is mounted inside the inner pot body 29 to carry a certain amount of soil in the inner pot body 20 and plant(s) in the soil. A certain amount of water W is filled in the space between the inner pot body 20 and the outer pot body 10. A water control device 40 is provided below the ventilation filter 42. The water control device 40 comprises a flexible split tube E connected to the water inlet 201, and a float 41 fixedly connected to one end, namely, the free end of the flexible split tube E remote from the water inlet 201. The float 41 moves with the water level in the inner pot body 20 below the ventilation filter 42. When the water level in the inner pot body 20 dropped below a predetermined low level, the float 41 is lowered with the water level, and the flexible split tube E is turned downwards to open the its split for enabling water W to pass from the outer pot body 10 into the inner pot body 20. When the water level in the inner pot body 20 surpassed a predetermined high level, the float 41 is lifted with the water level, and the flexible split tube E is turned upwards to close its split again. Further, if excessive rain water is accumulated in the inner pot body 20, it immediately flows out of the inner pot body 20 and the outer pot body 10 through the water passage A in the hollow lock screw bolt 30 and the air hole 12 of the upright bottom tube 11 of the outer pot body 10.

Figure 4:
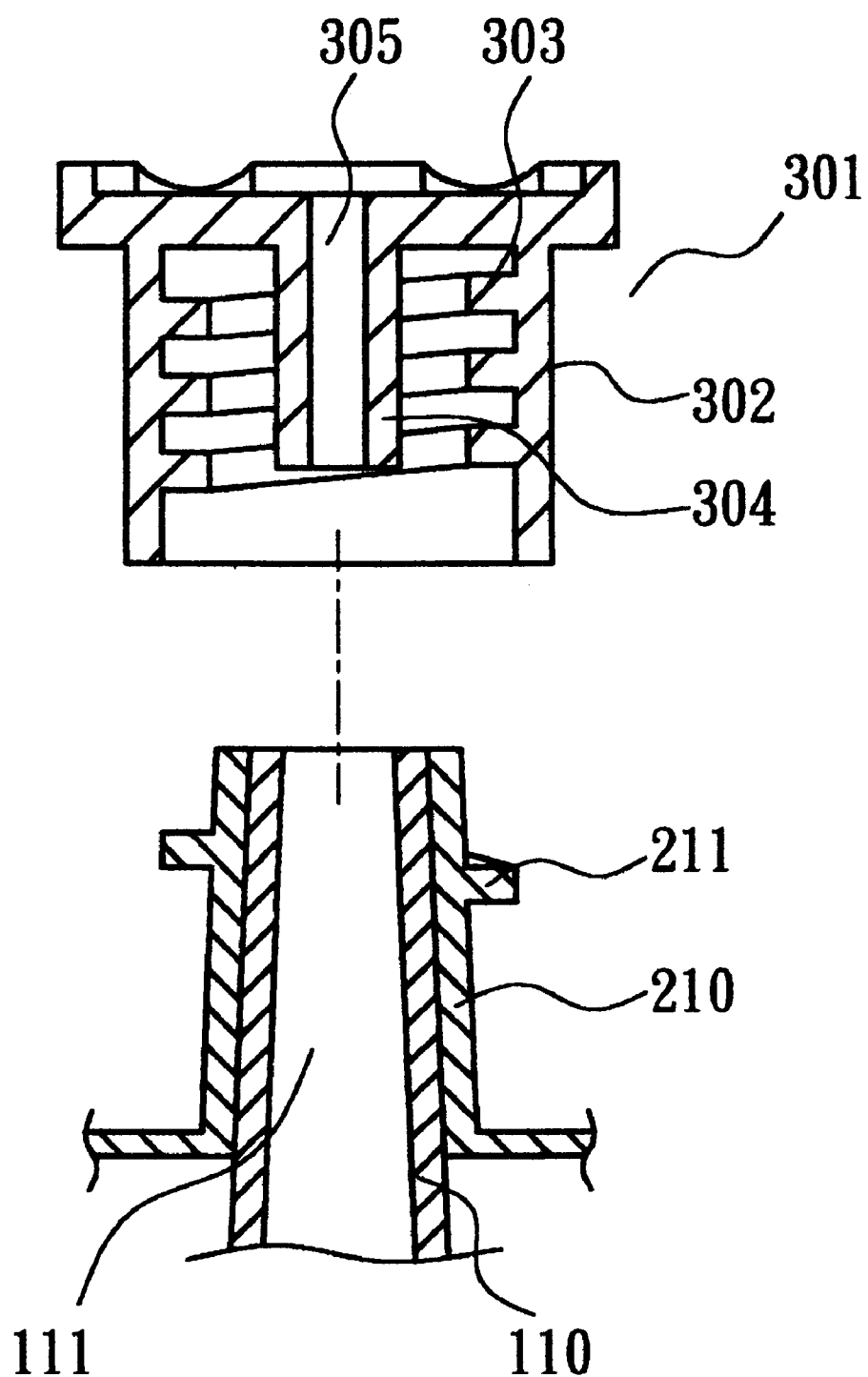
FIG. 4 is an exploded view of a part of an alternate form of the double-layer flowerpot according to the present invention.
Figure 5:
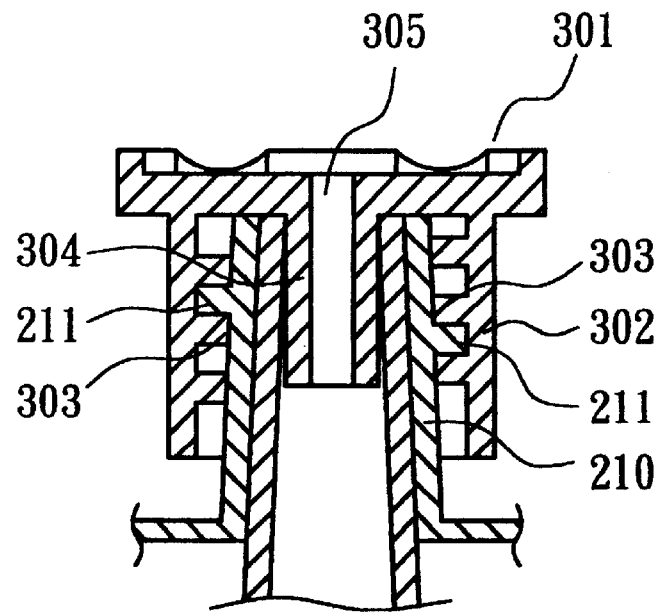
FIG. 5 is a sectional assembly view of FIG. 4.

FIGS. 4 and 5 show an alternate form of the present invention. According to this alternate form, the upright bottom tube 110 of the outer pot body is inserted into the upright bottom tube 210 of the inner pot body, defining an axially extended air hole 111; the upright bottom tube 210 of the inner pot body has an outer thread 211 extended around the periphery; the lock screw bolt 301 comprises a hollow shank 302, an inner thread 303 extended around the inside wall of the hollow shank 302 and threaded into the outer thread 211 of the upright bottom tube 210 of the inner pot body, an inner tube 304 suspended in the hollow shank 302 and plugged into the air hole 111 of the upright bottom tube 110 of the outer pot body, and an air hole 305 axially extended through the inner tube 304.

Figure 6:
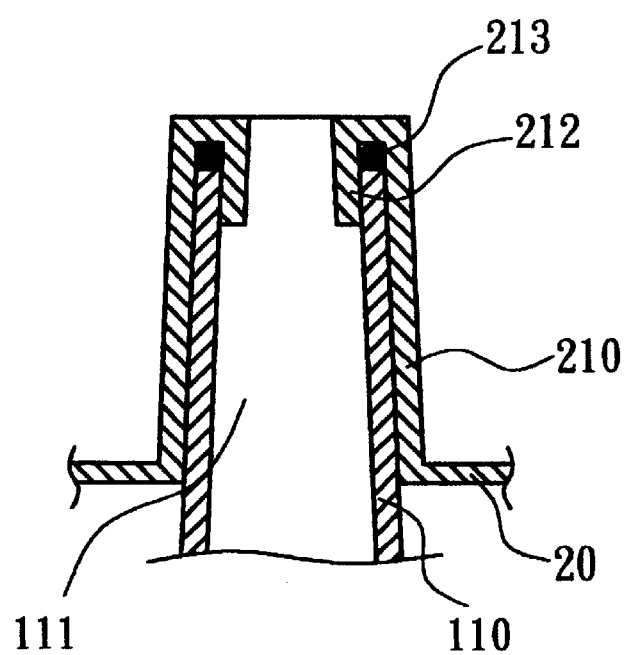
FIG. 6 is a sectional view of a part of another alternate form of the present invention.

FIG. 6 shows another alternate form of the present invention. According to this alternate form, the upright bottom tube 210, of the inner pot body 20 has an annular inside coupling flange 212 plugged into the air hole 111 of the upright bottom tube 110 of the outer pot body, and a gasket ring 213 is sealed between the annular inside coupling flange 212 of the upright bottom tube 210 of the inner pot body 20 and the topmost edge of the upright bottom tube 110 of the outer pot body.

A prototype of double-layer flowerpot has been constructed with the features of FIGS. 2~6. The double-layer flowerpot functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A double-layer flowerpot comprising an outer pot body, said outer pot body having at least one upright bottom tube and at least one air hole respectively axially extended through the at least one upright bottom tube, an inner pot body mounted in said outer pot body, said inner pot body having at least one upright bottom tube respectively sleeved onto the at least one upright bottom tube of said outer pot body and a water inlet adapted for guiding water from said outer pot body into the inside of said inner pot body, wherein each upright bottom tube of said outer pot body has an inner thread, and a lock screw bolt is respectively fastened to each of the at least one upright bottom tube of said outer pot body to secure said outer pot body to said inner pot body, said lock screw bolt comprising a hollow head stopped at the topmost edge of the corresponding upright bottom tube of said inner pot body and the topmost edge of the corresponding upright bottom tube of said outer pot body, a threaded shank downwardly extended from said hollow head and threaded into the inner thread of the corresponding upright bottom tube of said outer pot body, and an air passage axially extended through said hollow head and said threaded shank.

2. The double-layer flowerpot as claimed in claim 1, wherein said outer pot body comprises a coupling flange extended around the periphery of the topmost edge thereof; said inner pot body comprises a top rim supported on the topmost edge of said outer pot body, and a coupling flange protruded from a top rim thereof and coupled to the coupling flange of said outer pot body.

3. The double-layer flowerpot as claimed in claim 1, wherein said lock screw bolt further comprises reinforcing ribs suspended in said hollow head.

* * * * *